Dec. 16, 1930.  T. ROMAGNOLI  1,785,651
SUN HEAT MOTOR
Filed May 17, 1928  2 Sheets-Sheet 2

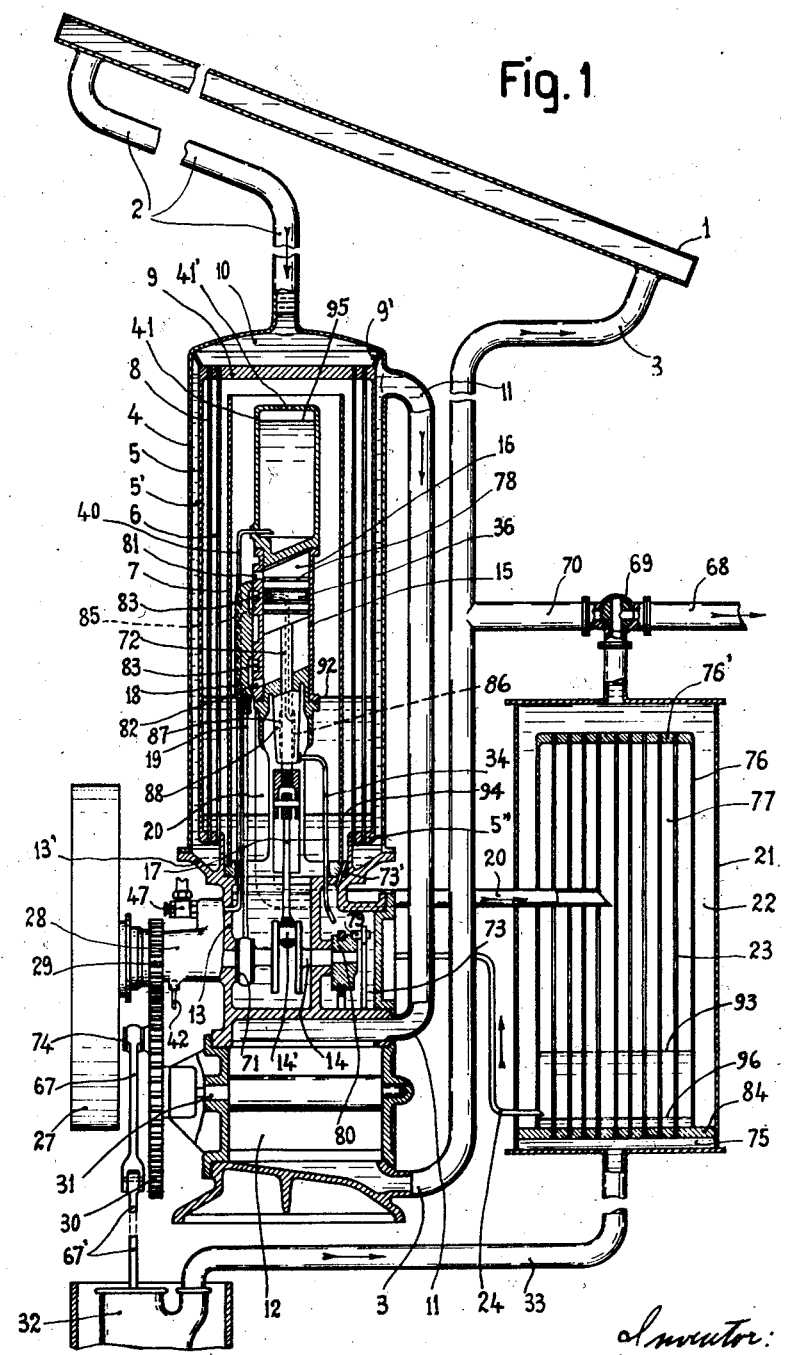

For connection with a vacuum producing pump

Inventor:
T. Romagnoli
By Lanyer, Parry, Card & hangur
attys

Patented Dec. 16, 1930

1,785,651

UNITED STATES PATENT OFFICE

TITO ROMAGNOLI, OF BOLOGNA, ITALY

SUN-HEAT MOTOR

Application filed May 17, 1928, Serial No. 278,603, and in Italy May 21, 1927.

The present invention relates to installations intended to recover sun heat and to convert it into motive force by the intermediate of an operating medium which is alternately in liquid state and in vapour state and whose pressure is exhausted in an engine.

This invention comprises a set of this kind in which the engine is enclosed within a sealed chamber where the operating medium is stored in liquid state and a fluid which has absorbed sun heat is caused to impart its heat to said operating medium.

This invention provides means for sealing the chamber where the operating medium is in vapour state by means of a lubricant which fills the bottom of said chamber and seals the packing gland of the engine, while means are provided for the recovery of said lubricant.

This invention comprises further features directed to secure a satisfactory operation of the set.

On the annexed drawing is shown by way of example an embodiment of the present invention and Figure 1 is a diagrammatical and fragmentary vertical section of a complete set;

Figure 4:
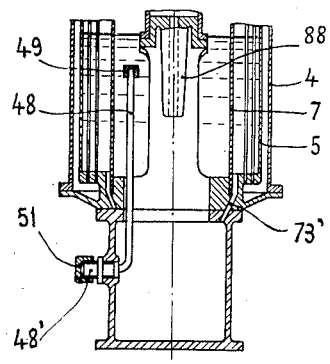
Figure 4 shows in vertical fragmentary section the lower portion of the engine casing.

The installation shown in Figure 1 comprises a heat absorber intended to collect sun heat and which consists of a closed receiver 1 of sheet metal arranged under a suitable inclination to collect sun radiations; tubes 2 and 3 lead from the top and bottom ends of said absorber 1 to a heat exchanger or vaporizer hereinafter described in which a fluid heated in heat absorber 1 imparts heat to operating medium.

Said vaporizer comprises a metal receiver 4 in which is located a concentric hollow casing 5 which comprises in cooperation with receiver 4 an intermediate annular space 5'. In casing 5 is located a drum 7 which in cooperation with casing 5 provides a further annular space 6 in which opens the top open end of said drum 7.

In space 6 are located tubes 8 which at their ends extend through top wall 9 of casing 5 having a flange 9' which provides in receiver 4 a top chamber 10 in which opens tube 2; at their bottom ends tubes 8 extend through a flange 5'' of casing 5 and open within space 5' which is closed at its bottom by a flange 13' of the engine casing.

A tube 11 leads from top portion of chamber 5' to the suction side of a rotary pump 12 whose pressure side is connected with pipe 3; the said pump 12 is driven by sun-heat engine as hereinafter described and causes the heat absorbing fluid to circulate through absorber 1, tube 2, chamber 10, tubes 8, space 5', pipe 11, pump 12, tube 3 and again to heat absorber as shown by arrows.

Figure 3:
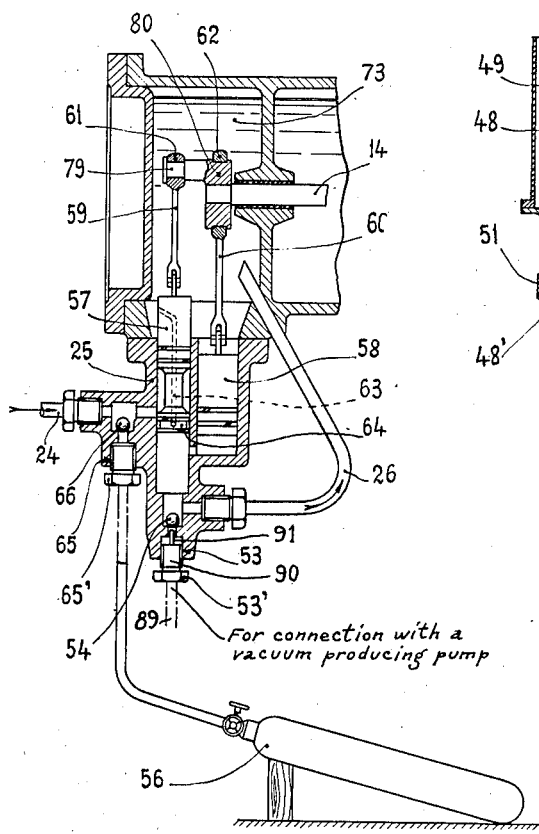
Figure 3 is a fragmentary section to an enlarged scale of the bottom portion of the engine, this figure being reversed from the showing in Figures 1 and 2.

Under receiver 4 is located a crank case 13 having flange 13' which closes the bottom end of receiver 4 and supports it; in the wall of said case 13 is journalled a crank shaft 14 having a crank pin 14', an eccentric 71 and further crank members 79—80; the crank pin 14' of said crank shaft is connected by rod 17 and stem 72 with the piston 16 of the driving engine while eccentric 71 actuates its slide distributor 18; crank members 79—80 are intended to actuate the piston 58 of a further pump 25 shown in Figure 3 and hereinafter described, and its distributor 57.

The engine comprises a cylinder 15 located inside drum 7, and having inclined top and bottom heads, and piston 16 reciprocating in said cylinder has similarly inclined top and bottom faces.

Inlet ports 81—82 of the contact or sliding surface of the slide distributor 18 open freely within drum 7 while the slide 18 is arranged and actuated to connect each chamber of the cylinder 15 and respective ports 81—82, when said chamber is in exhaust conditions, with recesses 83 and tube 20 connected with said recesses and leading to a condenser for the operating medium, as hereinafter described.

Said condenser comprises a receiver 21 in which is enclosed a casing 76 providing in said receiver, spaces 22 and 77, the bottom wall 84 of said casing providing a further chamber 75; tubes 23 are inserted through the top wall 76' and bottom one 84 of casing 76 to provide for a circulation of cooling medium through condenser space 77 in which opens the exhaust tube 20 leading from engine cylinder.

A tube 24 collects the condensate within space 77 and leads it to the suction side of a pump 25 hereinafter described and illustrated in detail in Figure 3 whose pressure side discharges through a tube 26 into space 73 and thence through port 73' into chamber 6 where the operating medium is vaporized as hereinafter described.

Said pump 25 is located in space 73 and comprises a piston 58 driven by rod 60 and eccentric 80 solid with crank shaft 14, and a reciprocating distributor 57 controlled by rod 59 and crank pin 79.

The crank shaft 14 has solid therewith a flywheel 27 and a pinion 29 which drives a gear wheel 30 solid with shaft 31 of pump 12 above referred to.

Said gear wheel has an eccentric pin 74 which actuates by means of rod 67 and stem 67' the piston (not shown) of pump 32 intended to cause a cooling liquid to flow from any source of fluid through tube 33, space 75, tubes 23, space 22, valve 69 and tube 68 to discharge, the valve 69 being usually adjusted to put chamber 22 in communication with outlet 68 while it provides means, when required, to put tube 68 in communication with tubes 70 and 3 for supply or withdrawal of heat absorbing fluid into or from heat absorber 1. The valve 69 is an ordinary three-way cock with a T-passage in its plug. During this operation a passage, controlled by a cock (not shown) in the top of the absorber 1 will be left open to allow air to escape or enter as usual.

The piston 16 of the engine is mounted to reciprocate in cylinder 15 and has inclined top and bottom faces, similar to top and bottom cylinder heads.

Said piston is provided with packing rings 78 and with a groove 36 intermediate them, which communicates through the port 85, hollow stem 72, port 86 and chamber 87 provided in the cylinder head 88 with a tube 34 which opens in space 73 this space communicating further by means of passage 63 with groove 64 of reciprocating distributor 57 of pump 25 (see Figure 3).

Figure 2:
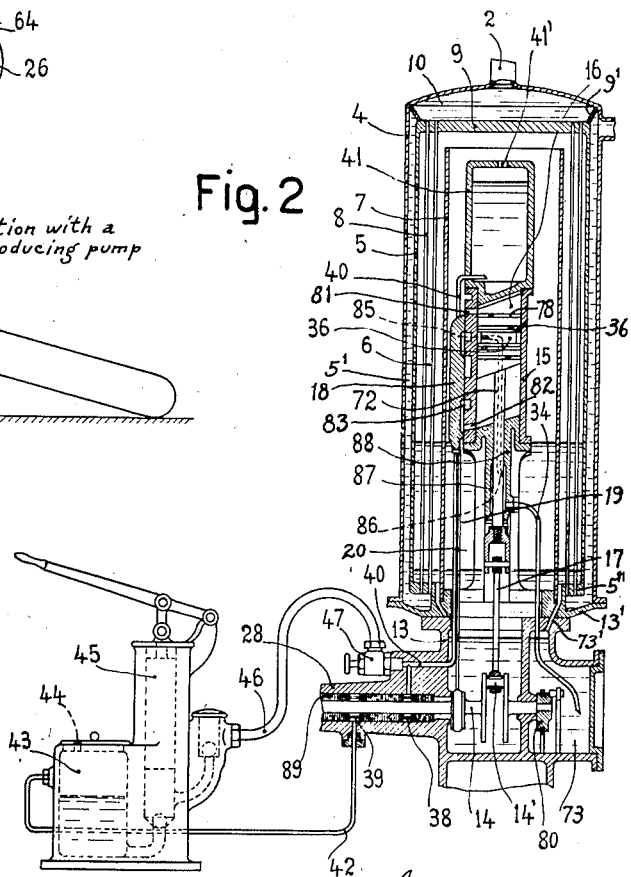
Figure 2 is a diagrammatic section with parts removed and intended to disclose means directed to seal the piston and packing gland of the engine.

The packing gland 28 for the passage of shaft 14 through the wall of the crank case 13, this being the single packing gland of the machine, is shown in detail in Figure 2 which also shows means for introducing lubricant in the engine.

Said packing gland comprises a packing material 89 divided into three sections by two intermediate grooved and perforated collars 38 and 39; the groove of collar 38 communicates by means of tube 40 with a receiver 41 arranged within the drum 7 above cylinder 15 and having a port 41' opening in the space within drum 7.

The second groove collar 39 communicates by means of tube 42 with an auxiliary reservoir 43 leading to atmosphere through a vent 44 and connected with the suction of a hand operated pump 45 whose outlet leads to tube 46, valve 47, tube 40 and receiver 41.

A tube 48 (Figure 4) extends into the bottom of the drum 7 and has at its outlet therein a head 49 having a restricted hole, while at its outer end said tube carries a fitting 48' closed by a removable plug 51.

An orifice 53 is provided in the bottom end of casing of pump 25 (Figure 3) and is closed by a plug 53', a ball valve 54 being located in said orifice; said orifice is adapted for connection with a tube 89 leading from a vacuum producing pump which tube has for connection with orifice 53 a fitting 90 having a stem 91 loosely entering said orifice and removing the ball valve 54 from its closed position when said fitting is screwed home in the orifice 53.

The suction side of pump 25 has a further orifice 65 having a ball valve 66 and a removable plug 65'; these means are intended for connecting the operating medium circuit with a bottle, as 56, containing operating medium when it is desired to introduce the charge of operating medium in the engine.

To put the set in condition for operation the heat absorber 1 and tubes 2 and 3 with spaces connected therewith are filled with water; a vacuum producing machine (not shown) is connected with orifice 53 after plug 53' has been removed, and a vacuum is produced in the engine through tube 26, the plug 53' being thereafter screwed home on its orifice.

A lubricant is introduced in the case 13, space 73 and bottom portion of drum 7; a lubricant is used having high viscosity and larger density than the operating medium used in the engine, and unable to dissolve therein.

Then a charge of operating medium is introduced by means of a bottle 56 connected with orifice 65 after removing plug 65'.

The pressure of the fluid within the bottle shifts off ball valve 66 and thereafter the plug 65, is again inserted in position. The charge of operating medium thus introduced must be sufficient to fill space 6, drum 7 and space 77 of condenser 21, with operating medium partly at the state of vapour and partly in the state of liquid.

In the drawing, line 92 indicates the level of the operating medium at liquid state in the space 6 and in the drum 7, and line 93 indicates the level of the liquid operating medium in the condenser 77.

Line 94 indicates the level of the lubricant in the space 6 and drum 7, line 95 is the level of lubricant in the receptacle 41, and line 96 is the level of lubricant in the condenser 77.

Glycerine may be used as lubricant and methyl chloride or another substance having a similar character may be used as operating medium.

In operation the heat absorbing liquid heated by sun radiation in heat absorber 1 flows through tube 2, space 10, tubes 8, chamber 5', tube 11, pump 12 and is returned to absorber 1 through tube 3; in said circulation it imparts heat to operating medium collected within space 6 which vaporizes and enters alternately either of the ports 81—82 and cooperating chambers of cylinder 15 under the control of the distributor 18.

The vaporized operating medium thus exhausts its pressure on the piston and moves it in cooperation with connecting means and shaft 14, and then it is discharged by slide distributor 18 and tube 20 to condenser 77 where it is condensed for further operation.

Shaft 14 drives pump 12 which promotes the circulation of heat absorbing fluid and also pump 32 which causes the flow of a cooling medium through tube 33, space 75, condenser tubes 23 and outlet 68; further said shaft 14 drives pump 25 which draws condensed operating medium from tube 24 and condenser 77 and conveys it into space 73.

Then operating medium moves up through the mass of heavier lubricant stored therein and unable to mix with it, and it flows through port 73', into space 6 for further vaporization and operation.

The described operation of the parts is maintained until heat absorbing fluid imparts heat to chamber 6 and operating medium located therein; the balance of power over that required to actuate the several service pumps may be availed of for any useful purpose.

In operation it is useful to locate an amount of lubricant in condenser 77 to reach the lower level of the mouth of tube 24 in said condenser; lubricant is also located in drum 7 to reach the bottom port 82 of cylinder, suitable connections leading to outside and provided with seal plugs (not shown) being provided for such purpose.

The lubricant entering the engine cylinder 15 is easily discharged therefrom during the exhaust period owing to the slope of the cylinder heads and of the piston faces.

The lubricant is also operative in securing the seal of the several members of the engine. This feature depends on the fact that the lubricant stored in drum 7 is subject to the highest pressure of the cycle this being the pressure of vapours of operating medium within the chamber 6 and top portion of drum 7; under such a pressure lubricant is forced through tube 34, chamber 87, port 86, hollow stem 72, and port 85 to the groove 36 of piston 16 and therefore it acts to prevent leakages of vapours of operative fluid from the cylinder.

Distributor 57 of pump 25 is also supplied with lubricant under pressure into its groove 64 through passage 63 provided in said distributor and opening in space 73 and in said groove.

The seal and lubricant recovery in packing gland 28 is secured by the fact that in space 38 the same pressure is operative as that acting in the drum 7 because said space 38 is connected by tube 40 with receiver 41 which contains lubricant under the vapour pressure acting therein through orifice 41' while in chamber 39 the atmospherical pressure is operative; therefore lubricant tends to flow from space 38 to space 39 and is therein collected and delivered therefrom by means of tube 42 to the recovery receiver 43 which is also under atmospherical pressure by its vent 44.

Lubricant escaping from the engine and collecting in the receiver 43 is again introduced into the receiver 41 by opening valve 47 and manipulating the hand operated pump 45 whose suction side is connected with receiver 43 while its pressure side is connected with valve 47 and tube 40 leading to receiver 41.

Said pump is also used to introduce the charge of lubricant in the receiver 41.

The amount of lubricant existing in receiver 41 is easily detected by the manipulation of pump 45 because when receiver 41 is not filled in with lubricant said pump is easily actuated the escape of vapours therefrom being easy through port 41'.

On the contrary a large resistance is found against the pump actuation when lubricant has filled receiver 41 and is issuing through orifice 41'.

To ascertain whether lubricant is at correct level in the drum 7 and parts connected therewith, the plug 51 closing tube 48 is removed.

Then, when the lubricant level is under the orifice of tube head 49 an escape of vapour is found, while when lubricant level is above head 49 a slow and small leakage of lubricant is detected.

Of course the means for recovery of lubricant may be omitted and then a supply of lubricant is to be introduced from time to time into the engine to substitute for leakages.

What I claim as my invention and desire to secure by United States Letters Patent is:—

1. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of operating medium, an engine cylinder extending in said vaporizing chamber and having ports opening therein, a piston reciprocating in said cylinder, a crank shaft and a connecting rod operated by said piston, said crank shaft being journalled in said vaporizing chamber, an exhaust duct, a distributor operated by said crank shaft and controlling said cylinder ports for timed communication of the same with said vaporizing chamber and said exhaust duct, a condenser connected with said exhaust duct, means for cooling said condenser and means conveying condensed operating medium from said condenser to said vaporizing chamber.

2. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of operating medium, an engine cylinder extending in said vaporizing chamber and having ports opening therein, a piston reciprocating in said cylinder and having an annular groove intermediate its ends, means for leading lubricant from said vaporizing chamber to said piston groove, a crank shaft and a connecting rod operated by said piston said crank shaft being journalled in said vaporizing chamber, an exhaust duct, a distributor operated by said crank shaft and controlling said cylinder ports for timed communication of the same with said vaporizing chamber and said exhaust duct, a condenser connected with said exhaust duct, means for cooling said condenser and means for conveying condensed operating medium from said condenser to said vaporizing chamber.

3. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of an operating medium, an engine cylinder extending in said vaporizing chamber and having ports opening therein, a piston reciprocating in said cylinder, the end faces of said cylinder and piston being inclined towards said ports, a crank shaft and a connecting rod operated by said piston, said crank shaft being journalled in said vaporizing chamber, an exhaust duct, a distributor operated by said crank shaft and controlling said cylinder ports for timed communication of the same with said vaporizing chamber and said exhaust duct, a condenser connected with said exhaust duct, means for cooling said condenser and means conveying condensed operating medium from said condenser to said vaporizing chamber.

4. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of an operating medium, an engine cylinder extending in said vaporizing chamber and having ports opening therein, a piston reciprocating in said cylinder, a crank shaft and a connecting rod operated by said means for journalling said crank shaft in said vaporizing chamber, a packing gland for said shaft journalling means providing spaces in said packing gland, means supplying lubricant under pressure of vaporized operating medium to that of said spaces which is adjacent to said vaporizing chamber, an outer reservoir, means connecting the one of said spaces adjacent to outside with said reservoir, an exhaust duct, a distributor operated by said crank shaft and controlling said cylinder ports for timed communication of the same with said vaporizing chamber and said exhaust duct, a condenser connected with said exhaust duct, means for cooling said condenser and means conveying said condensed operating medium from said condenser to said vaporizing chamber.

5. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of an operating medium, an engine cylinder extending in said vaporizing chamber and having ports opening therein, a piston reciprocating in said cylinder, a crank shaft and a connecting rod operated by said piston, a journal for said crank shaft in said vaporizing chamber, a packing gland for said shaft journal, means providing spaces in said packing gland, means supplying lubricant under pressure of said vaporized operating medium to that of said spaces which is adjacent to said vaporizing chamber, an outer reservoir, means connecting the one of said spaces adjacent to outside with said reservoir, a pump connected with said reservoir, means connecting the outlet of last named pump with said vaporizing chamber, an exhaust duct, a distributor operated by said crank shaft and controlling said cylinder ports for timed communication of the same with said vaporizing chamber and said exhaust duct, a condenser connected with said exhaust duct, means for cooling said condenser and means conveying condensed operating medium from said condenser to said vaporizing chamber.

6. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of an operating medium, an engine cylinder extending in said vaporizing chamber and having ports opening therein, a piston reciprocating in said cylinder, a crank shaft and a connecting rod operated by said piston, a journal for said crank shaft in said vaporizing chamber, a packing gland for said shaft journal, means providing spaces in said packing gland, a receptacle in said operating medium vaporizing chamber and opening therein at its top, said receptacle containing lubricant, a tube connecting the bottom of said receptacle with the one of said spaces of the packing gland adjacent to said vaporizing chamber, an outer reservoir and means connecting said reservoir with the one of said packing gland spaces adjacent to outside, means for introducing lubricant in said receptacle, an exhaust duct, a distributor operated by said crank shaft and controlling said cylinder ports for timed communication of the same with said vaporizing chamber and exhaust duct, a condenser connected with said exhaust duct, means for cooling said condenser and means conveying condensed operating medium from said condenser to said vaporizing chamber.

7. A sun heat operated motor comprising a heat absorber, a heat exchanger, a fluid, means for circulating said fluid through said heat absorber and exchanger, said heat exchanger providing a sealed vaporizing chamber containing a bottom body of lubricant and a supernatant body of an operating medium, an engine cylinder extending in said vaporizing chamber and having ports opening therein, a piston reciprocating in said cylinder, a crank shaft and a connecting rod operated by said piston, a journal for said crank shaft in said vaporizing chamber, a packing gland for said shaft journal, means providing spaces in said packing gland, a receptacle in said operating medium vaporizing chamber and opening therein through a top restricted orifice, said receptacle containing a lubricant, a tube connecting the bottom of said receptacle with the one of said spaces in said packing gland adjacent to the vaporizing chamber wall, an outer reservoir, means connecting said reservoir with the one of said packing gland spaces adjacent to outside, a pump having its inlet connected with said outer reservoir and its outlet connected with said receptacle, an exhaust duct, a distributor operated by said crank shaft and controlling said cylinder ports for timed communication of the same with said vaporizing chamber and exhaust duct, a condenser connected with said exhaust duct, means for cooling said condenser and means conveying condensed operating medium from said condenser to said vaporizing chamber.

8. A sun heat operated motor comprising a heat absorber, a heat exchanger, a fluid, means for circulating said fluid through said heat absorber and exchanger, said heat exchanger providing a sealed vaporizing chamber containing a bottom layer of lubricant and a supernatant body of operating medium, an engine cylinder extending in said chamber and having ports opening therein, a piston reciprocating in said cylinder, a crank shaft and a connecting rod operated by said piston said crank shaft being journalled in said vaporizing chamber, an exhaust duct, a distributor operated by said crank shaft and controlling said cylinder ports for timed communication of the same with said vaporizing chamber and exhaust duct, a condenser connected with said exhaust duct, means for cooling said condenser, a pump driven by said crank shaft, said pump being located in said vaporizing chamber under the level of lubricant therein, said pump drawing operating medium from said condenser after its condensation and conveying it into said vaporizing chamber for repeated vaporization and operation.

9. A sun heat operated motor comprising a heat absorber, a heat exchanger, a fluid, means for circulating said fluid through said heat absorber and exchanger, said heat exchanger providing a sealed vaporizing chamber containing a bottom body of lubricant and a supernatant body of an operating medium, an engine cylinder extending in said vaporizing chamber and having ports opening therein, a piston reciprocating in said cylinder, a crank shaft and a connecting rod operated by said piston said crank shaft being journalled in said vaporizing chamber, an exhaust duct, a distributor operated by said crank shaft and controlling said cylinder ports for timed communication of the same with said vaporizing chamber and exhaust duct, a condenser connected with said exhaust duct, means for cooling said condenser and a pump driven by said crank shaft and located in said vaporizing chamber under the level of lubricant therein, said pump drawing condensed operating medium from said condenser and conveying it into said vaporizing chamber, and said pump having a distributor provided with a groove and a passage leading to said groove from said vaporizing chamber to supply lubricant in said groove under the pressure of vaporized operating medium.

10. A sun heat operated motor comprising a heat absorber, a heat exchanger, a fluid, means for circulating said fluid through said heat absorber and exchanger, said heat exchanger providing a sealed vaporizing chamber containing a bottom body of lubricant and a supernatant body of an operating medium, a tube opening in said vaporizing chamber through a restricted orifice and leading to outside, means for sealing the outlet of said tube and for opening it to ascertain the level of lubricant in said vaporizing chamber by the leakage through said orifice and tube when said sealing means are open, an engine cylinder extending in said chamber and having ports opening therein, a piston reciprocating in said cylinder, a crank shaft and a connecting rod operated by said piston said crank shaft being journalled in said vaporizing chamber, an exhaust duct, a distributor operated by said crank shaft and controlling said cylinder ports for timed communication of the same with said vaporizing chamber and exhaust duct, a condenser connected with said exhaust duct, means for cooling said condenser and means conveying condensed operating medium from said condenser to said vaporizing chamber.

11. A sun heat operated motor comprising a heat absorber, a receiver, a casing in said receiver, a drum in said casing, tubes extending in said casing intermediate said casing and drum and opening in said receiver, a heat absorbing fluid, a pump for circulating said heat absorbing fluid through said heat absorber, tubes and casing, an engine cylinder located in said drum and having ports opening therein, an exhaust duct, a distributor controlling the timed communication of said cylinder ports with the space inside said drum and said exhaust duct, a piston reciprocating in said cylinder, a piston rod, a crank case supporting said casing and drum and communicating with space inside said casing and drum, a crank shaft mounted in said crank case, crank means on said crank shaft connected with said piston rod and actuating said distributor, a condenser connected with said exhaust duct, means for cooling said condenser, said crank case casing and drum containing a lubricant and a supernatant body of operating medium, a pump drawing condensed operating medium from said condenser and conveying it to said crank case and casing and drum, means for actuating by said crank shaft said heat absorbing fluid circulating pump, condensed operating medium conveying pump and condenser cooling means, a receptacle in said drum opening therein through a restricted orifice, means leading lubricant under pressure of vaporized medium from said receptacle to crank shaft supporting means in said crank case, means for collecting lubricant leaking from said crank shaft supporting means, means for forcing said collected lubricant to said receptacle, means for introducing operating medium in said drum and means for supplying lubricant under the pressure of vaporized operating medium to moving parts of said engine and condensed operating medium pump.

12. A sun heat operated motor comprising a heat absorber, a receiver, a casing in said receiver, a drum in said casing, tubes extending in said casing intermediate said casing and drum and opening in said receiver, a heat absorbing fluid, a pump for circulating said heat absorbing fluid through said heat absorber, tubes and casing, an engine cylinder located in said drum and having ports opening therein, an exhaust duct, a distributor controlling the timed communication of said cylinder ports with the space inside said drum and said exhaust duct, a piston reciprocating in said cylinder, a piston rod, a crank case supporting said casing and drum and communicating with the space inside said casing and drum, a crank shaft supported in said crank case, said crank shaft being connected with said piston rod and having crank means operating said distributor, a condenser connected with said exhaust duct, means for cooling said condenser, said crank case casing and drum containing a lubricant and a supernatant body of operating medium, a pump conveying condensed operating medium from said condenser to said crank case casing and drum, means for actuating said heat absorbing pump, condensed operating medium fluid circulating pump and cooling means from said crank shaft, means for lubricating and sealing supporting means for said crank shaft in said crank case and means leading lubricant under vaporized operating medium pressure to said engine piston crank shaft supporting means and moving parts of said condensed operating medium pump.

13. A sun heat operated motor comprising a heat absorber, a receiver, a casing in said receiver, a drum in said casing, tubes extending in said casing intermediate said casing and drum and opening in said receiver, a heat absorbing fluid, a pump for circulating said heat absorbing fluid through said heat absorber, tubes and casing, an engine cylinder located in said drum and having ports opening therein, an exhaust duct, a distributor controlling the timed communication of said cylinder ports with the space inside said drum and said exhaust duct, a piston reciprocating in said cylinder, a piston rod, a crank case supporting said casing and drum and communicating with the space inside said casing and drum, a crank shaft journalled in said crank case, crank means on said crank shaft connected with said piston rod and actuating said distributor, a condenser connected with said exhaust duct, means for cooling said condenser, said crank case casing and drum containing a lubricant and a supernatant body of operating medium, a pump drawing condensed operating medium from said condenser and conveying it to said crank case and casing and drum, means for actuating said heat absorbing fluid circulating pump, condensed operating medium conveying pump and condenser cooling means by said crank shaft, a receptacle in said drum opening therein through a restricted orifice and containing a lubricant, means leading lubricant under the pressure of the vaporized operating medium from said receptacle to crank shaft supporting means in said crank case, means leading lubricant under the pressure of the said vaporized operating fluid to said engine piston, said piston and cylinder having faces inclined towards said ports, means for collecting lubricant leaking from said crank shaft supporting means, means for forcing said collected lubricant to said receptacle, means for introducing operating medium in said drum, means for detecting the level of said lubricant in said crank case and drum and means for supplying lubricant under the vaporized operating medium pressure to moving parts of said condensed operating medium conveying pump In testimony whereof I have signed my name to this specification.

TITO ROMAGNOLI. [L. S.]